Figure 1:
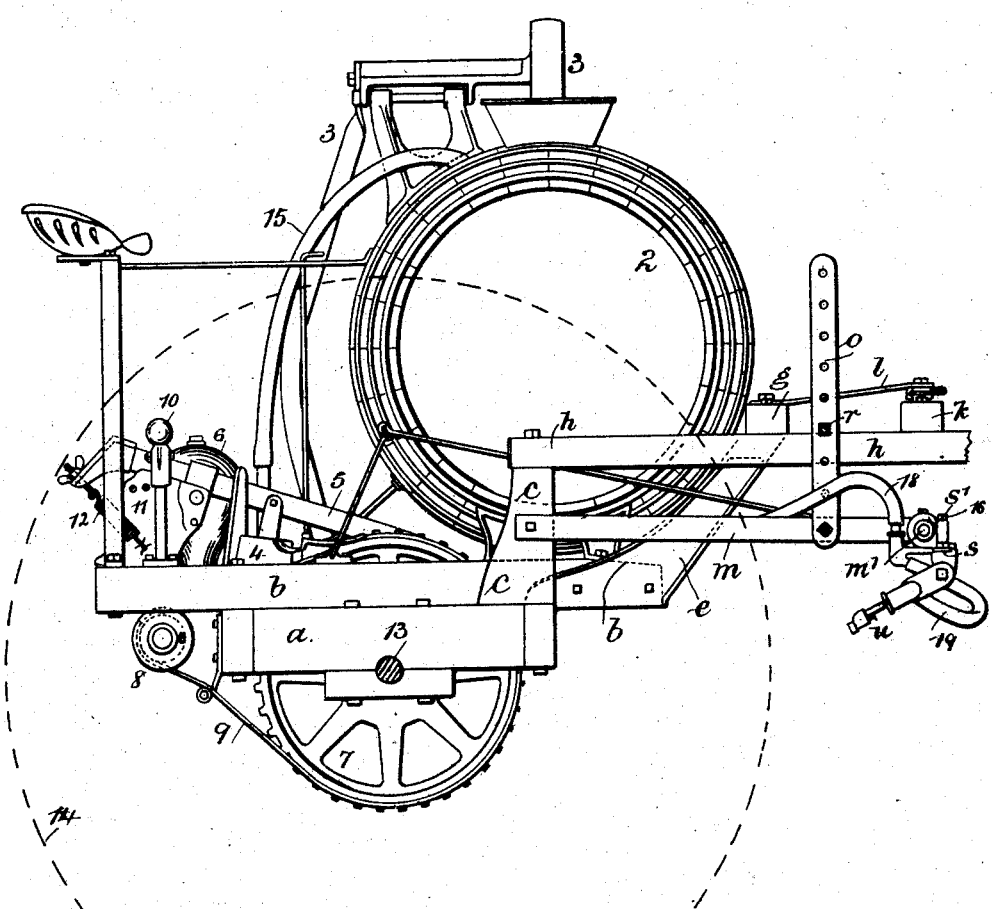

No. 864,501. PATENTED AUG. 27, 1907.
L. A. ASPINWALL.
LIQUID SPRAYER.
APPLICATION FILED JUNE 13, 1906.

2 SHEETS—SHEET 1.

Witnesses

Inventor
Lewis Augustus Aspinwall
for Harold Serrell
his atty.

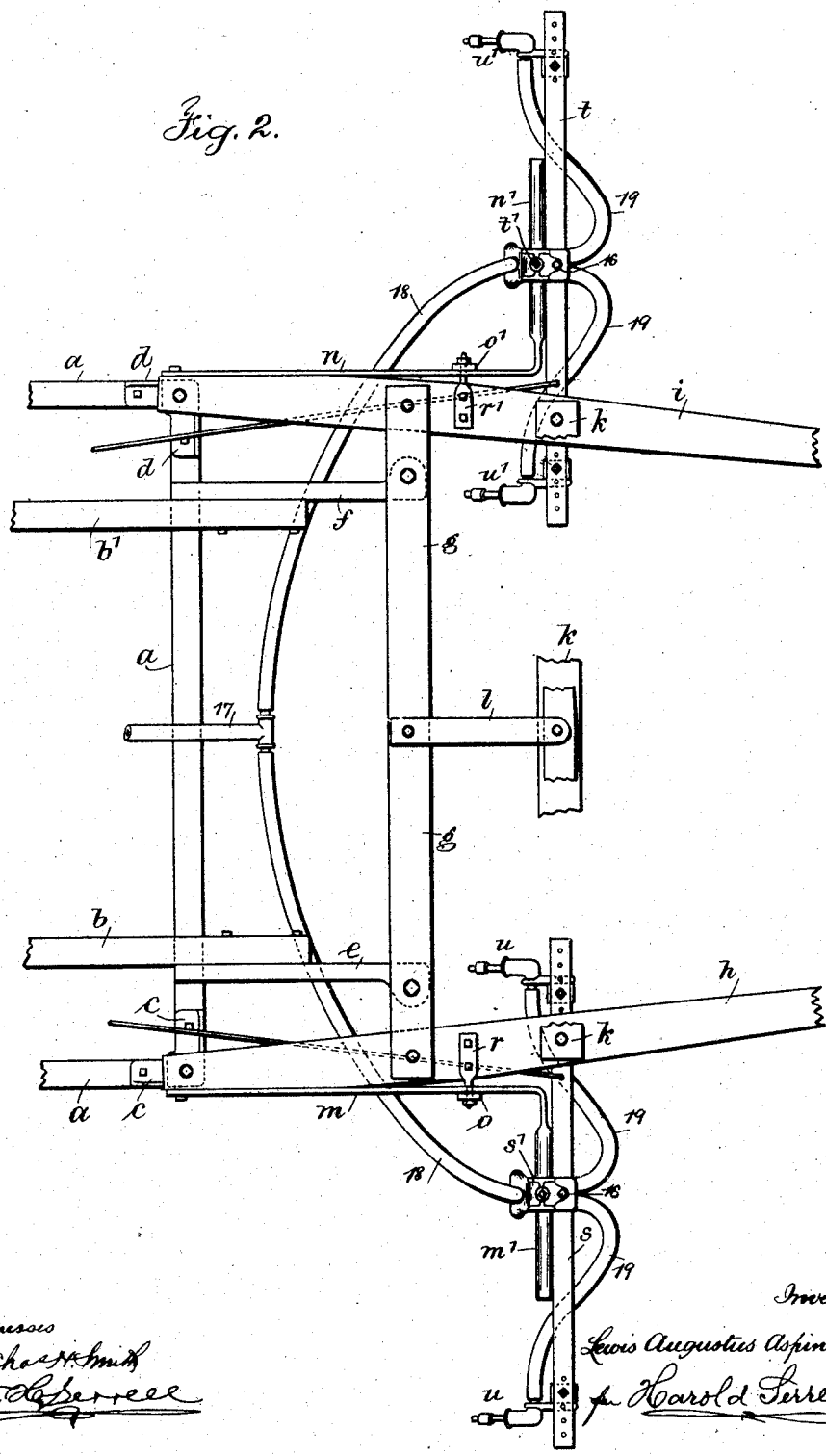

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

LIQUID-SPRAYER.

No. 864,501.  Specification of Letters Patent.  Patented Aug. 27, 1907.

Application filed June 13, 1906. Serial No. 321,439.

*To all whom it may concern:*

Be it known that I, LEWIS AUGUSTUS ASPINWALL, a citizen of the United States, residing at Jackson, in the county of Jackson and State of Michigan, have invented a new and useful Improvement in Liquid-Sprayers, of which the following is a specification.

My present invention relates to improvements on the liquid spraying devices described and shown in Letters Patent heretofore granted to me, and the main objects of my invention are to place the shafts on a higher level so as to be more nearly horizontal and to obtain a more perfect adjustment for changing the height of the spraying nozzles; these objects being more or less complementary to one another because where the shafts are lower down it is not possible to obtain the desired adjustment of the spraying nozzles.

In the device of my present invention I employ angular corner posts mounted upon and secured to the main frame and inclined brackets resting at their lower ends upon the main frame and connected to the adjacent ends of auxiliary frame members. The upper ends of the brackets carry a cross member and the shafts are connected to and supported by said corner posts and cross member.

A second cross member is connected to the shafts forward of the aforesaid cross member and said cross members serve to make the shafts more rigid and they serve as a support for the draft bar to which a horse or other animal drawing the machine is secured.

I employ substantially horizontal bars placed longitudinally of the liquid spraying machine for carrying the spraying devices, and which bars are pivotally connected at one end to the corner posts and are suspended by vertical adjustable bars connected to the shafts so that the desired height may be obtained for the spraying devices; and the extent of this adjustment is greater than that which I have heretofore been able to employ.

The forward ends of the bars carrying the spraying devices are bent at right angles and preferably made round and they support swivel bars carrying the spraying nozzles, and these swivel bars are adjustable on the central pivot and the nozzle connections secured at the ends of the swivel bars are adjustable from a vertical to any desired inclined position.

In the drawing, Figure 1 is a side elevation and Fig. 2 a plan showing the devices of my improvement.

The parts shown in the drawing, and which are common in liquid spraying devices heretofore employed by me and shown and described in Letters Patent granted to me, comprise the liquid holding barrel 2, the agitator device 3 pivotally mounted upon the liquid holding barrel having a paddle part going down into the barrel and an operating arm extending downward to other parts of the mechanism, a pump 4, a pump beam 5 for actuating the piston of the pump, an air chamber 6, a sprocket 7 on the main axle 13, a pinion 8 on an auxiliary axle and a chain or band 9 passing around the same so that the rotation and the power of the main axle are communicated through the chain or band from the sprocket to the pinion, a throw-out lever 10, a yielding frame 11 and spring 12 connecting the pump beam to devices mounted on the auxiliary axle. These parts are supported upon a main frame $a$ and 14 represents a main wheel in dotted outline and 15 a pipe for the liquid extending from the liquid holding barrel to the pump.

The special features of my present invention comprise the auxiliary frame members $b$ $b^1$ which are parallel with one another, extend lengthwise of the machine and are supported upon and secured to the main frame. Upon the opposite forward corners of the main frame are angular corner posts $c$, $d$ secured to the main frame, and $e$ $f$ represent forwardly inclined brackets. These brackets rest upon the main frame; in fact they are shown as having a notched portion at the back to rest upon the cross bar of the main frame and they extend alongside of and parallel with the projecting ends of the auxiliary frame members $b$ $b^1$ and they are securely bolted to these frame members so that their position for support and strength is secured.

A cross member $g$ is securely fastened to the forward higher ends of the brackets $e$ $f$ and the ends of this member project beyond the brackets. The shafts are represented at $h$ $i$, their rear ends resting upon, supported by and secured to the said corner posts $c$ $d$. These shafts extend under the projecting ends of the cross member $g$ and they are secured thereto by bolts; therefore the shafts have a firm support, between which and their connection to the rigidly secured brackets $e f$ there is no chance for said shafts to become loosened or misplaced and when so connected with the machine in operative position these shafts are substantially horizontal.

I employ a second cross member $k$ forward of the cross member $g$, the ends of which rest upon and are bolted to the shafts $h$ $i$, said cross member serving to make the shafts even more rigidly built. At the center of these cross members $g$ $k$ I place a draft bar $l$, which draft bar may be of any desired character, to which the horse or other animal drawing the machine is to be secured by suitable harness.

The main frame, the auxiliary frame members, the shafts and the cross members are preferably made of wood, while the angular corner posts and forwardly inclined brackets are preferably made of metal not only for strength but to form a rigid connection between the parts.

I employ bars of metal $m$ $n$ which occupy substantially a horizontal position. These bars are pivotally connected at their rear ends to the sides of the corner posts $c\ d$ and their forward ends are bent outwardly at substantially right angles to the main portions of the bar and are preferably rounded; these latter parts being indicated at $m^1\ n^1$. To support the said bars $m\ n$ and their bent ends and to regulate the adjustable height thereof I employ vertical bars $o\ o^1$ provided with a series of holes spaced apart and on the shafts there are support pins $r\ r^1$ which are adapted to pass through any one of the holes of the said vertical bars $o\ o^1$; the ends of said support pins being preferably threaded to receive a nut and washer which serve to securely clamp the said vertical bars to said support pins, it being understood of course that said vertical bars at their lower ends are pivotally connected to the bars $m\ n$.

I provide transversely placed bars $s\ t$ secured by swivel connections $s^1\ t^1$ to the bent ends $m^1\ n^1$ of the bars $m\ n$; said bars $s\ t$ being adapted to swing on the pivots 16 16 of said swivel connections from a transverse position to an inclined position in either direction. To the respective bars $s\ t$ are secured the spraying nozzle devices.

I prefer to make the swivel connections $s^1\ t^1$ in part tubular so that the pipes 18 for the spraying liquid may be connected thereto and the branching pipes 19 for the spraying liquid may extend out therefrom to the spraying nozzles $u\ u^1$, and 17 represents a pipe and its coupler which extends from the air chamber 6 conveying the liquid for spraying to the pipes 18.

The pipes 18 and 19 may be metal pipes or rubber pipes or hose which it is preferable to employ because the rubber hose is free from any tendency to corrode and clog the nozzles with sediment produced by the corrosion as is the case with metal pipes.

The swivel connections $s'\ t'$ form a protection to the rubber hose.

I claim as my invention:

1. In a liquid sprayer device, the combination with the main frame, the shafts and auxiliary frame members, of devices interposed between the said parts for elevating the shafts into a plane appreciably higher than the plane occupied by said frame members and for connecting and supporting said shafts in a rigid relation thereto and devices in a plane substantially intermediate of said planes for adjustably supporting the spraying devices.

2. In a liquid spraying device, the combination with the main frame and the shafts, of angular corner posts upon the forward corners of the main frame rising above the same and secured thereto and to which the rear ends of the shafts are secured and devices also extending from said main frame and located between the said shafts for assisting in supporting the shafts in an elevated position.

3. In a liquid spraying device, the combination with the main frame and the shafts, of angular corner posts upon the forward corners of the main frame rising above the same and secured thereto and to which the rear ends of the shafts are secured, a cross member extending from shaft to shaft forward of the main frame, forwardly inclined brackets resting at their lower rear ends upon the main frame and connected at their forward elevated ends to the said cross member.

4. In a liquid spraying device, the combination with the main frame and the shafts, of angular corner posts upon the forward corners of the main frame rising above the same and secured thereto and to which the rear ends of the shafts are secured, auxiliary frame members resting upon and secured to the main frame and having projecting ends, forwardly inclined brackets resting at their lower rear ends on the main frame and secured adjacent thereto to the projecting ends of the auxiliary frame members, a cross member extending from shaft to shaft forward of the main frame, coming above the forward higher ends of the said brackets and secured thereto whereby the shafts are not only connected to and supported from the corner posts but by the forward ends of said brackets.

5. In a liquid spraying device, the combination with the main frame and the shafts, of angular corner posts upon the forward corners of the main frame rising above the same and secured thereto and to which the rear ends of the shafts are secured, a cross member extending from shaft to shaft forward of the main frame, forwardly inclined brackets resting at their lower rear ends upon the main frame and connected at their forward elevated ends to the said cross member and a second cross member extending from shaft to shaft forward to the aforesaid cross member and a draft bar centrally secured to said cross member.

6. In a liquid spraying device, the combination with the main frame, the shafts, means for supporting the shafts in an elevated position above and forward of the main frame, of bars pivotally mounted at their rear ends to said shaft supports, means pivotally connected near the forward ends of said bars and having an adjustable supported relation to said shafts, liquid spraying nozzles and means for supporting the same at the forward ends of said bars in a plane below the plane of the shafts.

7. In a liquid spraying device, the combination with the main frame, corner posts thereto, shafts secured to the corner posts and devices co-acting with the corner posts for securing the shafts in an elevated position, of bars pivotally connected at their rear ends to said corner posts and having forward ends bent at right angles thereto, means pivotally connected to said bars near their forward ends and having an adjustable relation for support from the said shafts, swivel connections secured to the forward ends of said bars and bars supported by said swivel connections and occupying a transverse position to the shafts, supporting nozzle devices mounted upon the said latter bars and rubber hose connections for spraying liquid.

8. In a liquid spraying device, the combination with the main frame, the shafts and supports therefor, of the bars $m\ n$, forward bent ends to said bars, pivotal connections for the rear ends of said bars, vertical bars $o\ o'$ pivoted to said bars $m\ n$ near their forward ends, support pins secured to said shaft and adapted to engage holes of the vertical bars $o\ o'$ to support the same in an adjustable relation to the shafts.

9. In a liquid spraying device, the combination with the main frame, the shafts and supports therefor, of the bars $m\ n$, forward bent ends to said bars, pivotal connections for the rear ends of said bars, vertical bars $o\ o'$ pivoted to said bars $m\ n$ near their forward ends, support pins secured to said shaft and adapted to engage holes of the vertical bars $o\ o'$ to support the same in an adjustable relation to the shafts, swivel connections mounted upon and adjustable along the bent ends of the bars $m\ n$, bars $s\ t$ connected to and supported by said swivel connections, spraying nozzle devices secured to the ends of the bars $s\ t$ and hose connections for spraying liquid.

Signed by me this 31st day of May, 1906.

LEWIS AUGUSTUS ASPINWALL.

Witnesses:
C. G. ROWLEY,
GEO. N. WHITNEY.